3,066,085
IRRADIATION GRAFTING OF ACRYLONITRILE ON VINYL CHLORIDE-VINYLIDENE CHLORIDE COPOLYMERS
Robert Roy Smith, East Bergholt, Dennis Charles Macmillan Mann, Mistley, and Enid Bevis, Colchester, England, assignors to B.X. Plastics Limited, Manningtree, England, a British company
No Drawing. Filed Sept. 2, 1958, Ser. No. 758,566
Claims priority, application Great Britain Sept. 4, 1957
10 Claims. (Cl. 204—154)

This invention relates to the manufacture of macromolecular materials, and more especially to graft copolymers.

When a polymer chain is reactivated and side chains consisting of another or the same monomer are caused to grow on the existing polymer, a so-called graft copolymer is obtained. The term "graft copolymer" is therefore used to designate a macromolecule in which the second polymeric chain exists as branches on the primary or "trunk" chain. A graft copolymer may be represented, for example, by the formula:

(1) 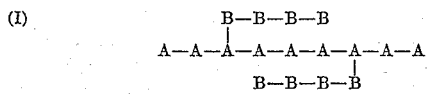

When, however, the polymer chain poly-A is broken and chains of another monomer (B) enter the chain and, so to speak, bridge the gap, so that in the resulting compound there is an alternation of long sequences of one unit with long sequences of another unit, a so-called "block copolymer" is obtained. A copolymer of this kind may be represented, for example, by the formula:

(2)  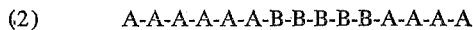

These graft and block compounds are distinct from ordinary copolymers in which the components are usually distributed at random in a straight or branched chain, and which may be represented, for example, by the formula:

(3)  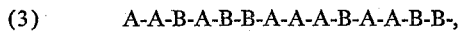

and they generally possess appreciably different properties from the ordinary copolymers.

Ordinary copolymers of the type illustrated by the Formula 3 above generally have properties which are intermediate between those of the two homopolymers poly-A and poly-B, whereas block copolymers, and especially graft copolymers, may possess both some of the properties of poly-A and some of poly-B. Thus, if the two constituents of a graft copolymer have hydrophilic and hydrophobic properties respectively, the material may act as a detergent and an emulsifier with unusual solubility properties.

Graft copolymers have been obtained by the "chain transfer" method. When a monomer (B) containing a dissolved polymer (poly-A) is polymerised, chain transfer of the growing radicals of B with poly-A leads to the formation of poly-B branches on the poly-A chain. This method, however, generally gives rise to appreciable amounts of the homopolymers poly-A and poly-B in addition to the desired graft product, and the separation of these homopolymers may be troublesome. Graft copolymers may be made by subjecting a polymer to ionising radiation while in contact with a monomeric vinyl or divinyl compound that is different from the monomer from which the polymer is derived.

The present invention provides new graft copolymers derived from vinyl chloride-vinylidene chloride copolymer and acrylonitrile and a process for their manufacture, wherein a copolymer of vinyl chloride and vinylidene chloride is subjected to ionising radiation while in contact with acrylonitrile monomer. When the monomer is in the liquid state, the mixture of copolymer and monomer subjected to irradiation (that is to say, the copolymer when swollen by the monomer) should contain a quantity of initial copolymer present to the extent of from 50 to 85 percent by weight calculated on the mixture. If the vinyl chloride-vinylidene chloride copolymer is contacted with acrylonitrile vapour, the copolymer should be swollen by the monomer absorbed so that the amount of the acrylonitrile component constitutes from 15 to 50 percent of the weight of the final swollen material. In the products of this process a certain proportion of the copolymer will be present as a block copolymer in admixture with the graft product.

Essentially thermoplastic or cross-linked structures can be obtained according to the conditions employed.

As the vinyl chloride-vinylidene chloride copolymer which is used as the trunk polymer in the process of the invention it is advantageous to use a copolymer containing not more than 25 percent of vinylidene chloride. The copolymer is preferably soaked in the acrylonitrile for a few hours to swell it, before subjection to irradiation.

The irradiation is advantageously carried out on the material in the substantial absence of oxygen as, for example, in vacuo. An ionising radiation there is to be understood radiation which is capable of producing ions in air under normal atmospheric conditions, which ions can be detected by their charge. As such radiation there may be mentioned $\beta$-rays, accelerated electrons, thermal neutrons, accelerated deuterons and protons, X-rays or, more especially, $\gamma$-rays. There may be used as sources of ionising radiation atomic piles, electron or particle accelerators, radioactive isotopes and X-ray equipment.

It is thought that upon irradiation ions are first formed on the vinyl chloride-vinylidene chloride copolymer, and that these lead to free radicals or "active centres," which initiate polymerisation of the acrylonitrile and provide points of attachment for the resulting acrylonitrile chains so as to form a graft product. As the ionising radiation may also form free radicals in the acrylonitrile monomer and cause polymerisation some homopolymer of acrylonitrile will be formed in addition to the graft copolymer, but this only occurs to a small extent.

The ionising radiation is advantageously $\gamma$-rays, for example, from a $Co^{60}$ source. The dose rate may be up to at least 50 mrep./minute, and in the case of $\gamma$-rays, preferably between 10,000 and 1,000,000 rep./hour. The properties of the final product and the degree of grafting may be varied by adjusting the dose-rate of the radiation and also by varying the temperature and duration of the treatment.

The systems of this invention graft-polymerise with surprising rapidity and remarkably low doses are therefore possible. Significant graft-polymerisation can be effected with doses of 20,000 rep. or less. It is rarely necessary to use more than one megarep. even when high dose rates are employed, as with an electron accelerator, unless inhibitors or retarders of polymerisation are present, for example, air.

In a particularly advantageous form of the invention the vinyl chloride-vinylidene chloride copolymer is in the form of a shaped body, especially a calendered film. It may, however, be in the form of a powder or dissolved in a solvent. In the case of a powder it is desirable to incorporate a stabiliser for vinyl chloride polymers.

In the mixtures of this invention, the acrylonitrile acts as a plasticiser before being graft polymerised and the mixtures containing monomer can be worked or shaped, for example, on a mill. The process of the invention yields shaped products of high softening point either by shaping the final graft product or the original copolymer or the unirradiated mixture containing monomer. There are advantages in shaping the unirradiated mixture or the original copolymer, each of which has a lower softening point than the final product.

The following examples illustrate the invention:

*Example 1*

A calendered sheet of an unplasticised copolymer of 96–98 parts by weight of vinyl chloride and 4–2 parts by weight of vinylidene chloride, containing 0.5 percent by weight of stearic acid, was soaked in acrylonitrile monomer for 10 hours at room temperature when its weight increased by 54 percent by swelling. The sheet was then sealed in a glass vessel in vacuo and subjected to γ-rays from a $Co^{60}$ source for 1 hour at a dose rate of 50,000 rep./hour, as a result of which the acrylonitrile in the swollen sheet polymerised to approximately 99 percent by weight and the product remained substantially clear. On pressing the product at 195° C. under a pressure of 5000 lbs. per square inch, a substantially clear, tough, rigid film was produced which was very much harder than the original copolymer and of about the same colour; the film was partially cross-linked judging by the action of solvents for polyvinyl chloride and poly-acrylonitrile, for example, dimethyl formamide, which was found to swell but not dissolve the film.

*Example 2*

A calendered sheet of an unplasticised copolymer of 96–98 parts by weight of vinyl chloride and 4–2 parts by weight of vinylidene chloride, containing 0.5 percent by weight of stearic acid, was soaked in acrylonitrile monomer as described in Example 1. It was then sealed in a glass vessel in vacuo and subjected to γ-rays from a $Co^{60}$ source for 24 minutes at a dose rate of 50,000 rep./hour, as a result of which the acrylonitrile in the swollen film polymerised to approximately 35 percent by weight, and the product remained substantially clear. The excess monomer was removed from the product in a vacuum oven and the product so obtained then contained 16 percent by weight of polyacrylonitrile. On pressing the product at 195° C. under a pressure of 5000 lbs. per square inch, a clear almost colourless, tough, rigid film was produced. Its softening behaviour indicated a non-crosslinked product with softening characteristics approximately 50° C. higher than that of the original copolymer sheet.

We claim:

1. A process for the manufacture of graft copolymers from vinyl chloride-vinylidene chloride copolymers, which comprises bringing a vinyl chloride copolymer, obtained by copolymerising from 75 to 98 percent by weight of vinyl chloride with from 25 to 2 percent by weight respectively of vinylidene chloride, into contact with acrylonitrile monomer, the initial vinyl chloride copolymer constituting from 50 to 85 percent by weight of the total weight of the copolymer and absorbed acrylonitrile, and subjecting the said copolymer and absorbed acrylonitrile in the substantial absence of oxygen to high energy, ionising radiation to induce graft polymerisation, the total radiation dose being within the range of 10,000 to 50,000 rep.

2. A process as claimed in claim 1, wherein the total radiation dose ranges from 10,000 to 20,000 rep.

3. A process as claimed in claim 1, wherein the ionising radiation comprises accelerated electrons.

4. A process as claimed in claim 1, wherein the ionising radiation comprises gamma rays and the radiation dose rate ranges from 10,000 to 1,000,000 rep./hour.

5. A process for the manufacture of a graft copolymer in the form of a shaped body, which comprises immersing a vinyl chloride copolymer, obtained by copolymerising from 75 to 98 percent by weight of vinyl chloride with from 25 to 2 percent by weight respectively of vinylidene chloride, in liquid acrylonitrile monomer until the vinyl chloride copolymer is in a swollen state, the initial vinyl chloride copolymer constituting from 50 to 85 percent by weight of the total weight of the copolymer when swollen by an acrylonitrile monomer, subjecting the swollen vinyl chloride copolymer in the substantial absence of oxygen to high energy, ionising radiation in a total radiation dose ranging from 10,00 to 50,000 rep., and subjecting the graft copolymer so obtained to a shaping operation.

6. A process as claimed in claim 5, wherein the shaped body is a calendered film.

7. A process for the manufacture of a shaped graft copolymer which comprises soaking with acrylonitrile monomer a vinyl chloride copolymer obtained by copolymerising from 75 to 98 percent by weight of vinyl chloride with from 25 to 2 percent by weight respectively of vinylidene chloride, the initial vinyl chloride copolymer constituting from 50 to 85 percent by weight of the total weight of the copolymer and absorbed acryonitrile monomer, then subjecting the soaked copolymer to a shaping operation and subsequently subjecting the shaped form to high energy, ionising radiation to induce graft polymerisation, the total dose of the radiation being within the range of 10,000 to 50,000 rep.

8. A process for the manufacture of graft copolymers from vinyl chloride-vinylidene chloride copolymers, which comprises exposing a vinyl chloride copolymer, obtained by copolymerising from 75 to 98 percent by weight of viyl chloride with from 25 to 2 percent by weight respectively of vinylidene chloride, to the vapour of acrylonitrile monomer to swell the copolymer, the copolymer being swollen by the monomer absorbed to an extent that the amount of the acrylonitrile component constitutes from 15 to 50 percent of the weight of the final swollen material, and subjecting the swollen copolymer in the substantial absence of oxygen to high energy, ionising radiation, the total radiation dose being within the range of 10,000 to 50,000 rep.

9. A process as claimed in claim 8, wherein the vinyl chloride copolymer is subjected to a shaping operation before exposure to the monomer vapour.

10. A process for the manufacture of graft copolymers from vinyl chloride-vinylidene chloride copolymers, which comprises soaking with acrylonitrile monomer a vinyl chloride copolymer, obtained by copolymerising from 75 to 98 percent by weight of vinyl chloride with from 25 to 2 percent by weight of vinylidene chloride, the initial vinyl chloride copolymer constituting from 50 to 85 percent by weight of the total weight of the copolymer and absorbed acrylonitrile, subjecting the said copolymer and absorbed acrylonitrile in the substantial absence of oxygen to high energy, ionising radiation in a total dosage within the range of from 10,000 to 50,000 rep., and subsequently removing the unpolymerised monomer by treatment under reduced pressure.

References Cited in the file of this patent

UNITED STATES PATENTS

| | | |
|---|---|---|
| 2,841,569 | Rugg et al. | July 1, 1958 |
| 2,849,419 | Hayes et al. | Aug. 26, 1958 |
| 2,863,812 | Graham | Dec. 9, 1958 |
| 2,878,174 | Rainer | Mar. 17, 1959 |

FOREIGN PATENTS

| | | |
|---|---|---|
| 1,130,099 | France | Sept. 17, 1956 |
| 1,130,100 | France | Sept. 17, 1956 |